(12) United States Patent
Farnung et al.

(10) Patent No.: US 6,842,266 B1
(45) Date of Patent: Jan. 11, 2005

(54) SYSTEMS AND METHODS THAT DETERMINE AN IMAGE PROCESSING SYSTEM TONE REPRODUCTION CURVE

(75) Inventors: Charles E. Farnung, Irondequoit, NY (US); Ramesh Nagarajan, Fairport, NY (US); Francis Tse, Rochester, NY (US); Julie A. Fisher, Rochester, NY (US); Regina M. Loverde, Webster, NY (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/512,889

(22) Filed: Feb. 25, 2000

(51) Int. Cl.[7] .......................... B41B 13/00; H04N 1/40; H04N 1/405; G06K 15/00
(52) U.S. Cl. .................. 358/1.9; 358/3.21; 358/3.24
(58) Field of Search ........................ 382/169; 358/1.9, 358/2.1, 3.01, 3.21, 448, 461, 518, 520, 521, 523, 525, 3.06, 3.1, 3.24

(56) References Cited

U.S. PATENT DOCUMENTS

| | | | | |
|---|---|---|---|---|
| 3,590,142 A | * | 6/1971 | Keller ........................ | 358/518 |
| 4,071,911 A | | 1/1978 | Mazur ........................ | 364/900 |
| 4,086,434 A | | 4/1978 | Bocchi .................... | 179/2 AM |
| 4,583,834 A | | 4/1986 | Seko et al. ................... | 355/14 |
| 5,038,319 A | | 8/1991 | Carter et al. ................ | 364/900 |
| 5,057,866 A | | 10/1991 | Hill, Jr. et al. ............. | 355/200 |
| 5,084,875 A | | 1/1992 | Weinberger et al. ........ | 371/291 |
| 5,313,310 A | * | 5/1994 | Numakura et al. ......... | 358/461 |
| 5,345,315 A | * | 9/1994 | Shalit ......................... | 358/406 |
| 5,347,369 A | * | 9/1994 | Harrington .................. | 358/401 |
| 5,365,310 A | | 11/1994 | Jenkins et al. .............. | 355/202 |
| 5,436,734 A | * | 7/1995 | Yamauchi et al. .......... | 358/448 |
| 5,452,403 A | * | 9/1995 | Miller ........................ | 358/1.9 |
| 5,508,826 A | * | 4/1996 | Lloyd et al. ................ | 358/501 |
| 5,510,876 A | | 4/1996 | Hayashi et al. ............. | 355/202 |
| 5,510,896 A | | 4/1996 | Wafler ........................ | 358/296 |
| 5,580,177 A | | 12/1996 | Gase et al. ................... | 400/61 |
| 5,612,902 A | * | 3/1997 | Stokes ........................ | 702/85 |
| 5,619,307 A | | 4/1997 | Machino et al. ............. | 399/11 |

FOREIGN PATENT DOCUMENTS

EP          0 854 632          7/1998 ............ H04N/1/32

OTHER PUBLICATIONS

"Remote Diagnostics Systems," Paul F. Morgan, Xerox Disclosure Journal, vol. 3, No. 3, May/Jun. 1978, pp. 191–192

"Real Time Fault Monitoring of Industrial Processes," Chapter 4.2.2.—Event–based architecture for real–time fault diagnosis, A.D. Pouliezos et al., Kluwer Academic Publishers, 1994, pp. 284–287.

"Fault Diagnosis in Dynamic Systems Using Analytical and Knowledge–based Redundancy—A Survey and Some New Results," Paul M. Frank, Automatica, vol. 26, 90 International Federation of Automatic Control, 1990, pp. 459–474.

"Combining Expert System and Analytical Redundancy Concepts for Fault–Tolerant Flight Control," David A. Handelman et al., Princeton University, J. Guidance, vol. 12, No. 1, Jan.–Feb. 1989, pp. 39–45.

*Primary Examiner*—Thomas D. Lee
*Assistant Examiner*—James A. Thompson
(74) *Attorney, Agent, or Firm*—Oliff & Berridge, PLC

(57) ABSTRACT

An image processing system receives image input terminal information and image output terminal information. Based on the content of the image input terminal information and the image output terminal information a new system tone reproduction curve is determined. This device independent methodology allows system tone reproduction curves to be generated as needed, and allows the additional flexibility for changes in the image input terminal or the image output terminal.

20 Claims, 2 Drawing Sheets

U.S. PATENT DOCUMENTS

| | | | |
|---|---|---|---|
| 5,642,202 A | 6/1997 | Williams et al. | 358/406 |
| 5,680,541 A | 10/1997 | Kurosu et al. | 395/183.02 |
| 5,694,528 A | 12/1997 | Hube | 395/113 |
| 5,727,135 A | 3/1998 | Webb et al. | 395/113 |
| 5,742,405 A * | 4/1998 | Spaulding et al. | 358/456 |
| 5,748,221 A | 5/1998 | Castelli et al. | 347/232 |
| 5,761,505 A | 6/1998 | Golson et al. | 395/653 |
| 5,884,118 A | 3/1999 | Mestha et al. | 399/15 |
| 5,892,451 A | 4/1999 | May et al. | 340/825.02 |
| 5,893,083 A | 4/1999 | Eshghi et al. | 706/45 |
| 6,023,525 A | 2/2000 | Cass | 382/162 |
| 6,023,595 A | 2/2000 | Suzuki et al. | 399/31 |

* cited by examiner

SYSTEMS AND METHODS THAT DETERMINE AN IMAGE PROCESSING SYSTEM TONE REPRODUCTION CURVE

BACKGROUND OF THE INVENTION

1. Field of Invention

This invention is related to image processing systems. In particular, this invention is directed towards systems and method that automatically determine an image processing system tone reproduction curve.

2. Description of Related Art

An image processing system tone reproduction curve (TRC) represents what the image processing portion of the system should output in gray level given a particular gray level input. The tone reproduction curve is derived from combining the characteristics of other portions of the system. In particular, the tone reproduction curve is based on characteristics of the image input terminal (IIT), image output terminal (IOT) and system tone reproduction curves. The resulting image processing system tone reproduction curve compensates for the image input terminal and image output terminal characteristics to arrive at the desired system output. In particular, image processing system tone reproduction curves are created during the product development phase and stored in data files on the actual device, or, for example, in the accompanying driver or software files. Therefore, each possible mode and each possible combination of image adjustment, such as contrast and brightness, has an associated image processing system tone reproduction curve stored in a data file. The data file corresponding to the image input terminal information and the image output terminal information was then referenced and applied by the image processing sub-system to the input image information.

SUMMARY OF THE INVENTION

By calculating all of the different permutations to account for image input terminal information and image output terminal information a great number of calculations were needed to derive the adjusted system tone reproduction curves. Furthermore, a tremendous amount of storage space is required to store all of the dedicated tone reproduction curves. For example, if the image processing system had three modes of processing with 7 contrast and 7 brightness levels for each mode, a total of 147 tone reproduction curves would need to be created. If each tone reproduction curve then had 256 points, and these points were stored as unsigned integers having 2 bytes per value, the total storage space needed would be approximately 75 kb. As more modes and more adjustments are needed, the storage space required and the time spent on creating all of the different combinations increases exponentially.

Accordingly, the systems and methods of this invention determine the image processing system tone reproduction curve automatically. In particular, upon a user selecting a particular mode of processing for the image processing device, such as photo, fine halftone, text, line art, or the like, a nominal system tone reproduction curve is referenced. Adjustments can be made to this nominal tone reproduction curve, such as contrast or brightness, as detailed in co-pending U.S. patent application Ser. No. 09/512,888, filed Feb. 25, 2000, now U.S. Pat. No. 6,753,987 B1 to Farnung et al. and incorporated herein by reference in its entirety. After any adjustments are made to the nominal tone reproduction curve, for example, using the systems and methods of co-pending U.S. patent application Ser. No. 09/512,769, filed Feb. 25, 2000 now U.S. Pat. No. 6,538,661 B1 to Farnung et al. and incorporated herein by reference in its entirety, the adjusted system tone reproduction curve is cascaded with the other tone reproduction curves which represent the image output terminal tone reproduction curve and the image input terminal tone reproduction curve. For example, the image output terminal tone reproduction curve can be selected by a user to correspond to a scanner, but may be fixed if the image processing system is, for example, a photocopier.

The result is that an image processing system tone reproduction curve is determined which can be used by an image processing sub-system therefore eliminating the time required to generate all of the possible combinations of tone reproduction during the product development phase, and also eliminating the need for storage space to store all of the dedicated tone reproduction curves. Furthermore, since the systems and methods of this invention use a device independent methodology, there is no need to predetermine all of the possible tone reproduction curve combinations if there is a change in the input or the output device.

This invention provides systems and methods that determine an image processing system tone reproduction curve.

This invention separately provides systems and methods that automatically determine a tone reproduction curve based on at least one of current image input terminal information and image output terminal information.

This invention additionally provides systems and methods that determine a gain, a black point, and an "L value" that represents a finite set of points which represent the desired input and output relationship for the system.

These and other features and advantages of this invention are described in, or apparent from, the following detailed description of the preferred embodiments.

BRIEF DESCRIPTION OF THE DRAWINGS

The preferred embodiments of this invention will be described in detail, with reference to the following figures, wherein.

DETAILED DESCRIPTION OF PREFERRED EMBODIMENTS

An image processing system receives image input data from an image source. Additionally, the image processing system retrieves information pertaining to the image source. A nominal system tone reproduction curve is then retrieved and converted to reflectance. The system reflectance values are then cascaded with the image source (IIT) tone reproduction curve to obtain the image processing system gray level values. If a system reflectance value is equal to an image source curve reflectance value, then the corresponding gray level out is used. Alternatively, if the system reflectance value is in between two image source curved reflectance values, then a new gray level out is calculated.

Next, the resulting system gray level is adjusted by a gain and an offset. The gain represents the inherent gain associated with the system tone reproduction curve and is calculated from a nominal system tone reproduction curve. The offset is calculated from the system tone reproduction curve and represents the theoretical output gray value when the input gray value is zero. The results of the calculation represent the new image processing system tone reproduction gray level.

Next, the image processing system tone reproduction curve gray level out is calculated. In particular, the image sink information is retrieved. Then, the system tone reproduction curve gray level out is determined. If the determined system value is equal to the image sink (IOT) value, then the corresponding gray level is used. Alternatively, if the system value is in between two image sink (IOT) values, then a new gray level is calculated.

The final image processing system tone reproduction curve is determined by combining the results of the system gray level determination and the system gray level out determination. This data file is then used by the image processing sub-system to adjust the image data to match the input and output relationship specified by the system tone reproduction curve for the mode of processing.

Figure 1:
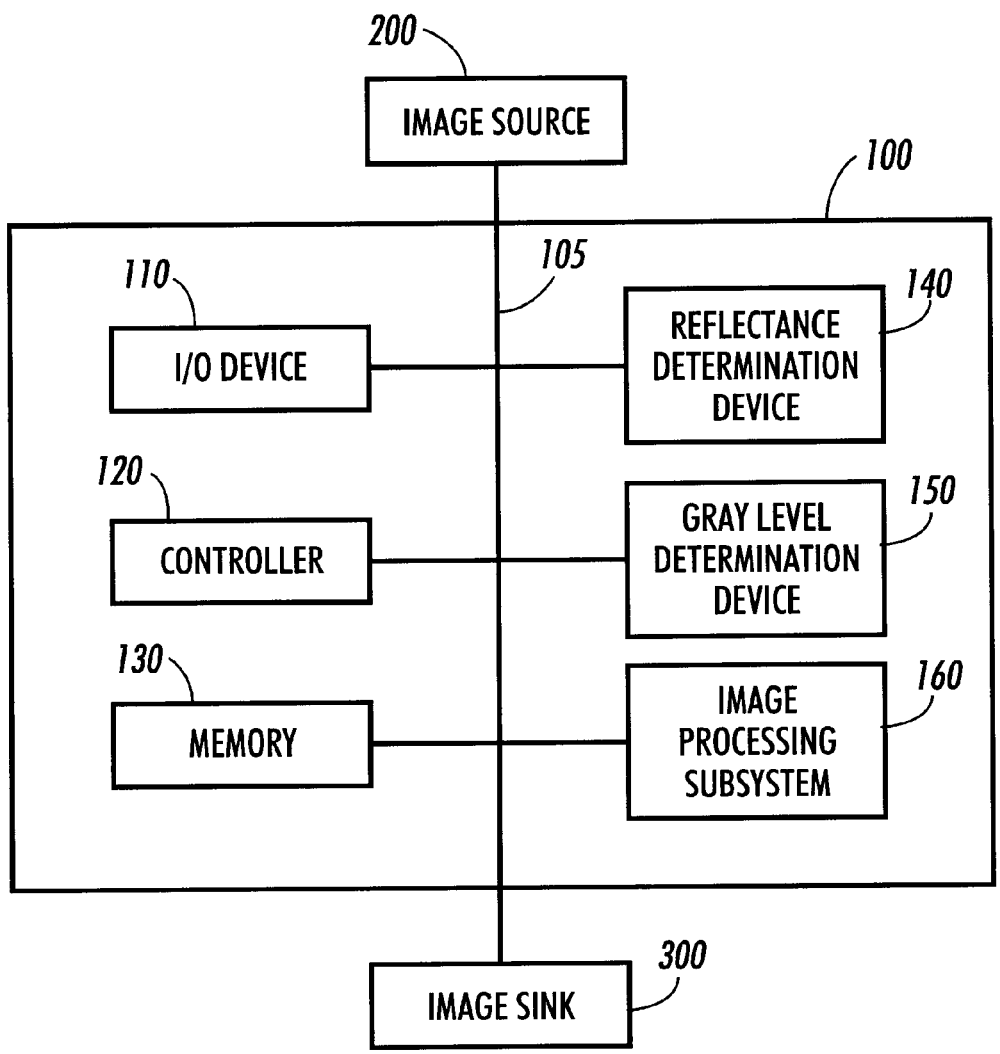
FIG. 1 is a functional block diagram showing an exemplary image processing system according to this invention.

FIG. 1 illustrates an exemplary flow chart of an image processing system according to this invention. In particular, the image processing system 100 comprises an I/O device 110, a controller 120, a memory 130, a reflectance determination device 140, a gray level determination device 150, and an image processing sub-system 160 all interconnected by link 105. Additionally, the image processing system 100 is connected to one or more image sources 200 and one or more image sinks 300.

The image source 200 can be any device that stores and/or generates an electronic version of an image.

Thus, the image can be a printed hard-copy version of the image, and the image source 200 can be a scanner that scans and outputs an electronic version of the image over the link 105 to the image processing system 100. Furthermore, the image source 200 and image processing system 100 can be elements integrated into a digital photocopier.

Similarly, the image source 200 can be a server or other node on a local area network, a wide area network, an intranet, the Internet, or any other distributing network. In this case, the image is already stored on the network in electronic form.

The image sink 300 receives the output of the image processing system 100. Thus, the resulting image received by the image sink 300 can be a printed or hard-copy version of the input image, and the image sink 300 can be a printer. Similarly, the image sink 300 can be a monitor which is capable of displaying an electronic version of the resulting image for viewing. Furthermore, the image source 200, the image processing system 100 and the image sink 300 can be elements integrated into a single device, such as a photocopier.

Similarly, the image sink 300 can be a server or other node on a local area network, a wide area network, an intranet, the Internet, or any other distributing network. In this case, the resulting image is transferred and stored on the network in electronic form.

The link 105 can be any wired or wireless link, or combination thereof, that supply image information between the connected elements. Thus, the image source 200 and the link 105 can be any known or later developed element(s) that is (are) capable of supplying an electronic image to the image processing system 100. Furthermore, the image sink 300 and the link 105 can be any known or later developed element(s) that is (are) capable of receiving an outputting or storing the resulting electronic image from the image processing system 100.

The image processing system 100 receives electronic image data from the image source 200, via link 105. Additionally, the image processing system 100 receives information about the image source 200, such as an identification of the type of image source. Having received electronic image information, and knowing the image source 200, the image processing system 100, in cooperation with controller 120 and memory 130 retrieves the stored system tone reproduction curve data. This system tone reproduction curve can be a contrast or a brightness adjusted tone reproduction curve, such as those described in U.S. Pat. No. 6,753,987 B1. This system tone reproduction curve data file contains a finite set of points that represent the desired input and output relationship for the image processing system 100. In the following description of the image processing system according to this invention, this relationship is represented as $L^*_{in}$ and $L^*_{out}$.

Next, the reflectance determination device 140 determines reflectance values based on the tone reproduction curve $L^*_{in}$ values. In particular, the reflectance in is determined in accordance with a bounded-domain piecewise-continuous relation:

$$R_{in} = \frac{L^*_{in}}{903.3} \text{ for } L^*_{in} \text{ values less than 8, and} \quad (1)$$

$$R_{in} = \left(\frac{L^*_{in} + 16}{116}\right)^3 \text{ for } L^*_{in} \text{ values greater than 8}$$

where $L^*_{in}$ is the system TRC $L^*_{in}$, values, and $R_{in}$ is the system reflectance in $R_{in}$ values.

While the relation is a piecewise continuous function of $R_{in}$ in $L^*_{in}$, the first derivative of the function is not necessarily continuous. The determined reflectance values are then cascaded by the controller 120 with the image source tone reproduction curve to obtain the system gray (or grey) level values g. The image source tone reproduction curve is represented as reflectance in versus gray level out. The image source reproduction curve can be stored in a data file representing the nominal input and output relationship for the image source.

Alternatively, the image source tone reproduction curve could possibly be provided by a real-time measurement or be selected from a stored bank of tone reproduction curves representing the possible image sources. Cascading is achieved by comparing each system reflectance value to the image source curve reflectance values. If a system reflectance value is equal to an image source curve reflectance value, then the corresponding gray level out is used. Alternatively, if the system reflectance value is in between two image source curve reflectance values, then a new gray level out g' is determined through linear interpolation as follows:

$$g' = \left(\frac{(g_h - g_l) \times (R - R_l)}{(R_h - R_l)}\right) \quad (2)$$

where:

g' is the system gray level out,

R is the system reflectance value, $R_l$ and $R_h$ are the lower and higher reflectance values on the IIT TRC, respectively, and $g_l$ and $g_h$ are the lower and higher gray level values on the IIT TRC, respectively.

This new gray level out is then adjusted by a gain and an offset to align the new gray level out value with the system tone reproduction curve gain value. In particular, the gray level is adjusted in accordance with:

$$g''=\text{gain} \times g' + \text{offset} \quad (3)$$

where:
g" is the adjusted system gray level out,
gain is the coefficient calculated from the system curve, and
offset is the bias calculated from the system curve.

The gain represents the inherent coefficient associated with the system tone reproduction curve and is determined from the nominal system tone reproduction curve by:

$$\text{gain} = \frac{255}{(wp - bp)} \quad (4)$$

where:
wp is the computed white point (the "darkest white", in other words, the lowest input gray level for which the output gray level is 255), and
bp is the computed black point, or the highest input level for which the output level is zero. This black point can then be adjusted to effect background suppression as detailed in co-pending U.S. patent application Ser. No. 09/512,887, filed Feb. 25, 2000, now U.S. Pat. No. 6,618,171 B1 to Tse et al. incorporate herein by reference in its entirety.

The wp is obtained from the system curve by converting the second highest L* input point from the system curve to a gray value g using Equations 1 and 5.

$$wp = \left(\frac{255}{0.92}\right) \times R_{in} \quad (5)$$

where:
$R_{in}$ is the computed reflectance in value from Equation 1 for the point in question.

The bp is obtained from the system curve by converting the second lowest L* input point from the system curve to a gray value using Equations 1 and 5.

Then, the offset is determined by:

offset=−gain×bp+tm (6)

The point determined from Equation 3 represents the new image processing system tone reproduction curve gray level in values.

Next, the image processing system tone reproduction curve gray level out values are determined. In particular, the system tone reproduction curve $L^*_{out}$ values are cascaded through the image sink 300 tone reproduction curve. The image sink tone reproduction curve is represented as the gray level out g' versus the $L^*_{out}$. Therefore, each system $L^*_{out}$ is compared to an image sink $L^*_{out}$ value. If a system value is equal to an image sink value, then a corresponding gray level is used. However, if the system value is in between two image sink values, then a new gray level is determined through linear interpolation. In particular, the new gray level g' is defined by:

$$g' = g_l \left( \frac{(g_h - g_l) \times (L^* - L^*_{10Tl})}{(L^*_{10Th} - L^*_{10Tl})} \right) \quad (7)$$

where:
g' is the new system gray level,

L* is the system $L^*_{out}$ value,
$L^*_{IOTl}$ and $L^*_{IOTh}$ are the lower and higher $L^*_{out}$ values on the IOT TRC, respectively, and
$g_l$ and $g_h$ are the lower and higher gray level values on the IOT TRC, respectively.

The final image processing system tone reproduction curve data file is then created by combining the system gray level in values and the system gray level out values. This data file is then stored in memory 130 and can be used by the image processing sub-system 160 to adjust the image data to match the input and output relationship specified by the system tone reproduction curve for the mode of processing, e.g., image source and image sink.

In addition to the image processing system tone reproduction curve, the image processing system 100 can output a gain, a black point, and an open "L value". The gain and black point can be used, for example, as default input image adjustments and the L value can be used, in conjunction with the black point to determine the amount of background suppression as discussed in U.S. Pat. No. 6,198,845 to Tse et al., and U.S. patent application Ser. No. 09/159,038 filed Sep. 23, 1998, now abandoned both of which are incorporated herein by reference in their entirety.

Figure 2:
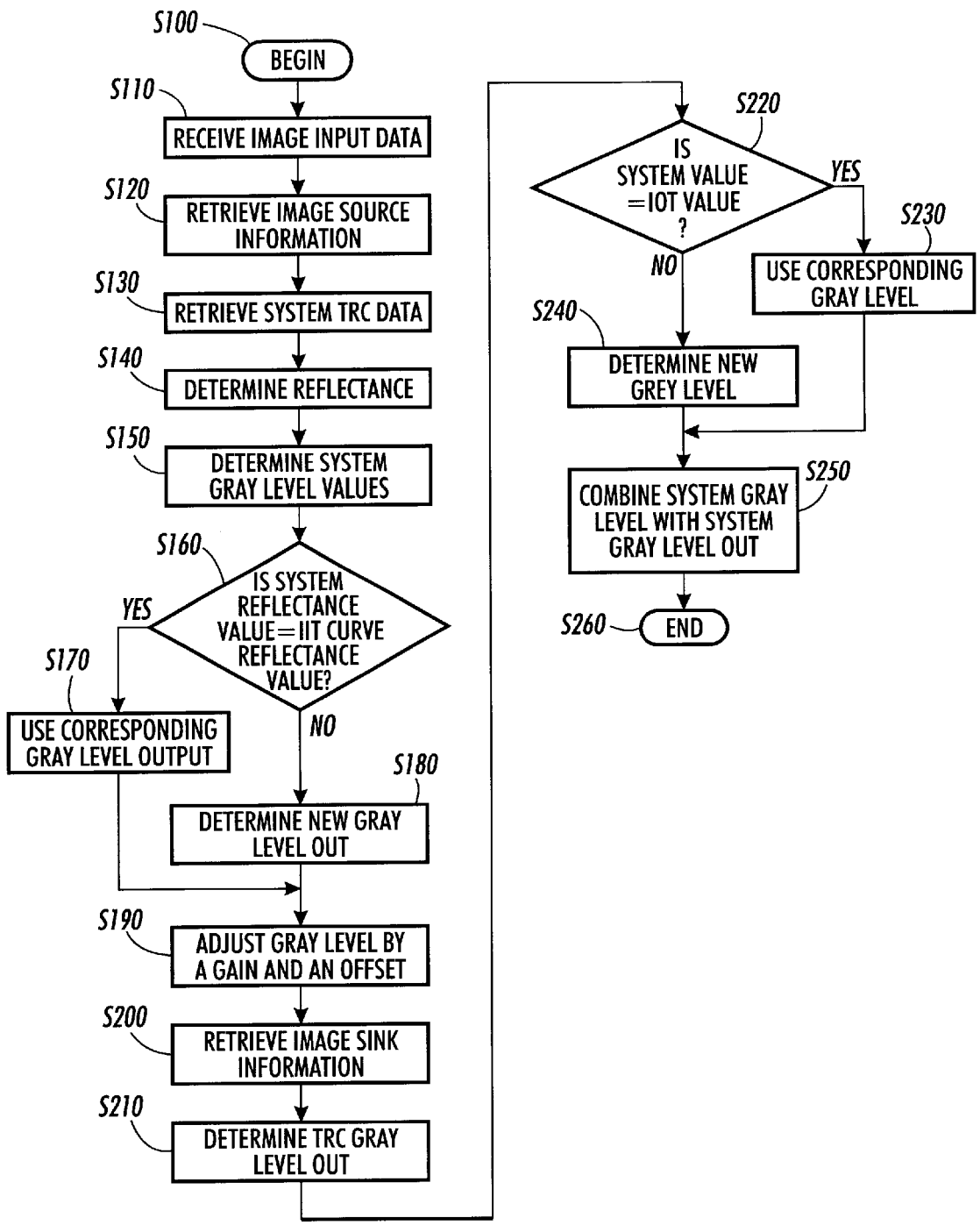
FIG. 2 is a flow chart outlining one exemplary embodiment of a method for determining an image processing system tone reproduction curve according to this invention.

FIG. 2 illustrates the operation of the image processing system according to this invention. Specifically, control begins in step S100 and continues to step S110. In step S110, the image input data are received. Next, in step S120, the image source information is retrieved. Then, in step S130, the system tone reproduction curve data are retrieved. Control then continues to step S140.

In step S140, the reflectance values are determined for the system tone reproduction curve input values. Next, in step S150, the system grade level values are determined. Then, in step S160, a determination is made whether the system reflectance value is equal to the image source (IIT) curve reflectance values.

If the system reflectance value is equal to the image source curve reflectance value, control continues to step S170 where the corresponding gray level output the system reflectance value is used. Control then jumps to step S190. Otherwise, control continues to step S180 where a new gray level output value is determined. Control then continues to step S190.

In step S190, the gray level is adjusted by a gain and an offset. Next, in step S200, the image sink (IOT) information is retrieved. Next, in step S210, the tone reproduction curve gray level out value is determined. Then, in step S220, a determination is made whether the system value is equal to the image sink value. If the system value is equal to the image sink value, control continues to step S230 where the corresponding gray level is used. Otherwise, control jumps to step S240 where a new gray level is determined. Control then continues to step S250.

In step S250, system gray level value is combined with the system gray level out value to obtain the final image processing system total reproduction curve data. Control then continues to step S260 where the control sequence ends.

As shown in FIG. 1, the image processing system is preferably implemented either on a single program general purpose computer or separate programmed general purpose computer, with associated image source and image sink devices. However, the image processing system can also be implemented on a special purpose computer, a programmed micro-processor or micro-controller and peripheral integrated circuit element, and ASIC or other integrated circuit, a digital signal processor, a hard-wired electronic or logic circuit such as a discrete element circuit, a programmable logic device such as a PLD, PLA, FPGA, PLA or the like. In general, any device capable of implementing a finite state machine that is in turn capable of implementing the flowchart shown in FIG. 2 can be used to implement the image processing system according to this invention.

Furthermore, the disclosed method may be readily implemented in software using object or object-oriented software development environments that provide portable source code that can be used on a variety of computer or workstation hardware platforms. Alternatively, it disclosed image processing system may be implemented partially or fully in hardware using standard logic circuits or a VLSI design. Whether software or hardware is used to implement the systems in accordance with this invention is dependent on the speed and/or efficiency requirements of the system, the particular function, and the particular software or hardware systems or microprocessor or microcomputer systems being utilized. The image processing systems and methods described above, however, can be readily implemented in hardware or software using any systems or structures, devices and/or software by those skilled in the applicable art without undo experimentation from the function of the described provided herein together with a general knowledge of the computer arts.

Moreover, the disclosed method may be readily implemented as software executed on a programmed general purpose computer, a special purpose computer, a microprocessor or the like. In this case, the methods and systems of this invention can be implemented as a routine embedded on a personal computer or as a resource residing on a server or graphics work station, such as a routine imbedded in a photocopier printer driver, or the like. The image processing system can also be implemented by physically incorporating the systems and methods into a software and/or hardware system, such as the hardware and software system of a personal computer, a photocopier, or a dedicated information processing system.

It is, therefore, apparent that there has been provided in accordance with the present invention, systems and methods for determining an image processing system tone reproduction curve. While this invention has been described in conjunction with the preferred embodiments thereof, it is evident that many alternatives, modifications and variations would be apparent to those skilled in the art. Accordingly, all such alternatives, modifications and variations that follow in the spirit and scope of this invention are embraced.

What is claimed is:

1. A system that determines an image processing system tone reproduction curve comprising:

an image processing system that dynamically adjusts an image processing system tone reproduction curve for a reproduction curve gray level value based on at least one of an image source identification and an image sink identification, the image processing system comprising:

a reflectance determination device that determines a reflectance value based on a system tone reproduction curve within a bounded-domain piecewise-continuous relation, and a gray level determination device that determines a system gray level value, determines the reproduction curve gray level value, and aligns the system gray level value with a system tone reproduction curve gain value to produce an updated reproduction gray level value.

2. The system of claim 1, wherein the reflectance determination device converts a system tone reproduction curve to a reflectance value by the bounded-domain piecewise-continuous relation defined by:

$$R_{in}=L^*_{in}/903.3 \text{ for } L^*_{in}<8, \text{ and}$$

$$R_{in}=\{(L^*_{in}+16)/116\}^3 \text{ for } L^*_{in}>8.$$

3. The system of claim 1, further comprising a controller that cascades the determined reflectance value with an image source tone reproduction curve to obtain the system gray level value.

4. The system of claim 1, further comprising wherein the gray level determination devices aligns the system gray level value with the system tone reproduction curve gain value to produce the updated image processing system tone reproduction gray level value by a linear interpretation defined by:

$$g'=\{(g_h-g_l)\times(R-R_l)\}/(R_h-R_l), \text{ where}$$

g' is the updated image processing system tone reproduction gray level value, $g_l$ and $g_h$ are lower and higher gray level values on the image processing system tone reproduction curve, respectively, R is the system reflectance value, and $R_l$ and $R_h$ are lower and higher reflectance values on the image processing system tone reproduction curve, respectively.

5. The system of claim 4, wherein an adjusted image processing system gray level is determined from the updated image processing system gray level determination by an adjustment relation:

$$g''=\text{gain}\times g'+\text{offset}, \text{ where}$$

g" and g' are the adjusted and updated image processing system gray levels, and gain is a coefficient and offset is a bias, both calculated from the system tone reproductive curve.

6. The system of claim 1, further comprising wherein the gray level determination device determines the image processing system tone reproduction curve gray level based on the image sink identification.

7. The system of claim 6, wherein if the image processing system tone reproduction curve is equal to the image processing system tone reproduction curve gray level, then the image processing system tone reproduction curve is used.

8. The system of claim 6, wherein if the image processing system tone reproduction curve is not equal to the image processing system tone reproduction curve gray level, then an updated image processing system tone reproduction curve gray level is determined by a linear interpretation defined by:

$$g'=\{(g_h-g_l)\times(R-R_l)\}/(R_h-R_l), \text{ where}$$

g' is the updated image processing system tone reproduction gray level value, $g_l$ and $g_h$, are lower and higher gray level values on the image processing system tone reproduction curve, respectively, R is the system reflectance value, and $R_l$ and $R_h$ are lower and higher reflectance values on the image processing system tone reproduction curve, respectively.

9. The system of claim 1, further comprising a data file that adjusts image data to match the input source identification and the output source identification specified by image processing system tone reproduction curve for a mode of processing.

10. The system of claim 9, wherein the mode of processing is at least one of photo, halftone, fine halftone, course halftone, text and line art.

11. A method for determining an image processing system tone reproduction curve for a reproduction curve gray level value comprising:

dynamically adjusting an image processing system tone reproduction curve based on at least one of an image source identification and an image sink identification;

determining a reflectance value based on a system tone reproduction curve within a bounded-domain piecewise-continuous relation; and determining a system gray level value, determining the reproduction curve gray level value, and aligning the system gray level value with a system tone reproduction curve gain value to produce an updated reproduction gray level value.

12. The method of claim 11, wherein determining the reflectance value based on the system tone reproduction curve uses the bounded-domain piecewise-continuous relation defined by:

$$R_{in}=L^*_{in}/903.3 \text{ for } L^*_{in}<8, \text{ and}$$

$$R_{in}=\{(L^*_{in}+16)/116\}^3 \text{ for } L^*_{in}>8.$$

13. The method of claim 11, further comprising cascading the determined reflectance value with an image source tone reproduction curve to obtains the system gray level value.

14. The method of claim 11, further comprising aligning a system gray level value with a system tone reproduction curve gain value to produce an updated image processing system tone reproduction gray level value by a linear interpretation defined by:

$$g'=\{(g_h-g_l)\times(R-R_l)\}/(R_h-R_l), \text{ where}$$

g' is the updated image processing system tone reproduction gray level value, $g_l$ and $g_h$ are lower and higher gray level values on the image processing system tone reproduction curve, respectively, R is the system reflectance value, and $R_l$ and $R_h$ are lower and higher reflectance values on the image processing system tone reproduction curve, respectively.

15. The method of claim 14, wherein an adjusted image processing system gray level is determined from the updated image processing system gray level by an adjustment relation:

$$g''=\text{gain}\times g'+\text{offset}, \text{ where}$$

g" and g' are the adjusted and updated image processing system gray levels, and gain is a coefficient and offset is a bias, both calculated from the system tone reproductive curve.

16. The method of claim 11, further comprising wherein determining the image processing system tone reproduction curve gray level is based on the image sink identification.

17. The method of claim 16, wherein if the image processing system tone reproduction curve is equal to the image processing system tone reproduction curve gray level, then the image processing system tone reproduction curve is used.

18. The method of claim 16, wherein if the image processing system tone reproduction curve is not equal to the image processing system tone reproduction curve gray level, then an updated image processing system tone reproduction curve gray level is determined by a linear interpretation defined by:

$$g'=\{(g_h-g_l)\times(R-R_l)\}/(R_h-R_l), \text{ where}$$

g' is the updated image processing system tone reproduction gray level value, $g_l$ and $g_h$ are lower and higher gray level values on the image processing system tone reproduction curve, respectively, R is the system reflectance value, and $R_l$ and $R_h$ are lower and higher reflectance values on the image processing system tone reproduction curve, respectively.

19. The method of claim 11, further comprising adjusting image data to match the input source identification and the output source identification specified by image processing system tone reproduction curve for a mode of processing.

20. The method of claim 19, wherein the mode of processing is at least one of photo, halftone, fine halftone, course halftone, text and line art.

* * * * *